United States Patent [19]

Waksberg

[11] 4,071,751
[45] Jan. 31, 1978

[54] AUTOMATIC OPTICAL BIAS CONTROL FOR LIGHT MODULATORS

[75] Inventor: Armand Waksberg, Dollard-des-Ormeaux, Canada

[73] Assignee: RCA Limited, Canada

[21] Appl. No.: 698,836

[22] Filed: June 23, 1976

[30] Foreign Application Priority Data

Apr. 26, 1976 United Kingdom ............ 250978/76

[51] Int. Cl.² ............................................... G01J 1/20
[52] U.S. Cl. ................................. 250/201; 350/157; 331/94.5 S; 250/225
[58] Field of Search ............... 250/201, 205, 225; 356/114, 117; 331/94.5 S; 350/157

[56] References Cited

U.S. PATENT DOCUMENTS

| | | | |
|---|---|---|---|
| 3,556,663 | 1/1971 | Cary | 356/117 X |
| 3,742,382 | 6/1973 | Smith | 331/94.5 |
| 3,780,296 | 12/1973 | Waksberg et al. | 250/201 |
| 3,925,603 | 12/1975 | Naruse | 250/201 |

*Primary Examiner*—David C. Nelms
*Assistant Examiner*—Vincent J. Sunderdick
*Attorney, Agent, or Firm*—Edward J. Norton; Roland L. Morneau

[57] ABSTRACT

In an electro-optic laser beam modulation system wherein the polarization modulation of the laser beam is converted into intensity modulation by an analyzer positioned in the path of the beam, a pair of photo-electric detectors detects a portion of the input and output beams. A divisor registers the ratio between the intensities detected. A compensator rotates the polarization of the output beam to establish a desired ratio, and a comparison system is connected to the divisor and the compensator to maintain the desired ratio.

6 Claims, 5 Drawing Figures

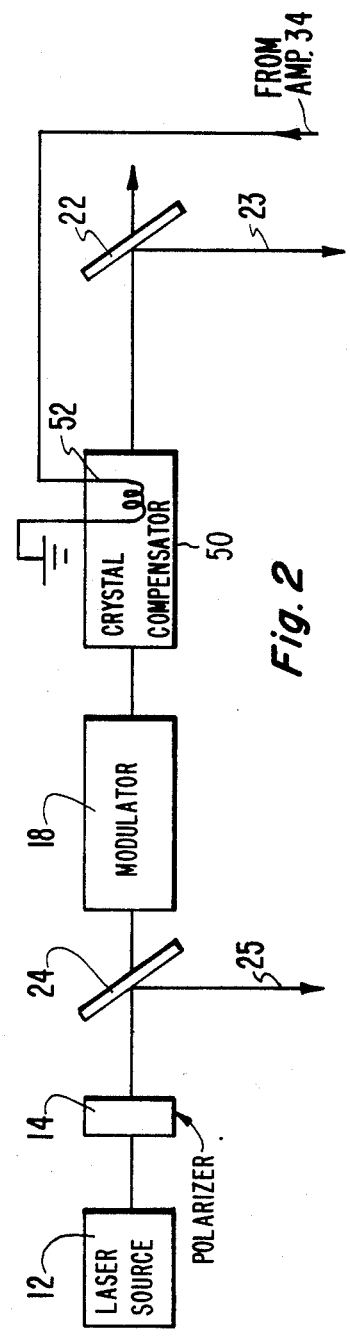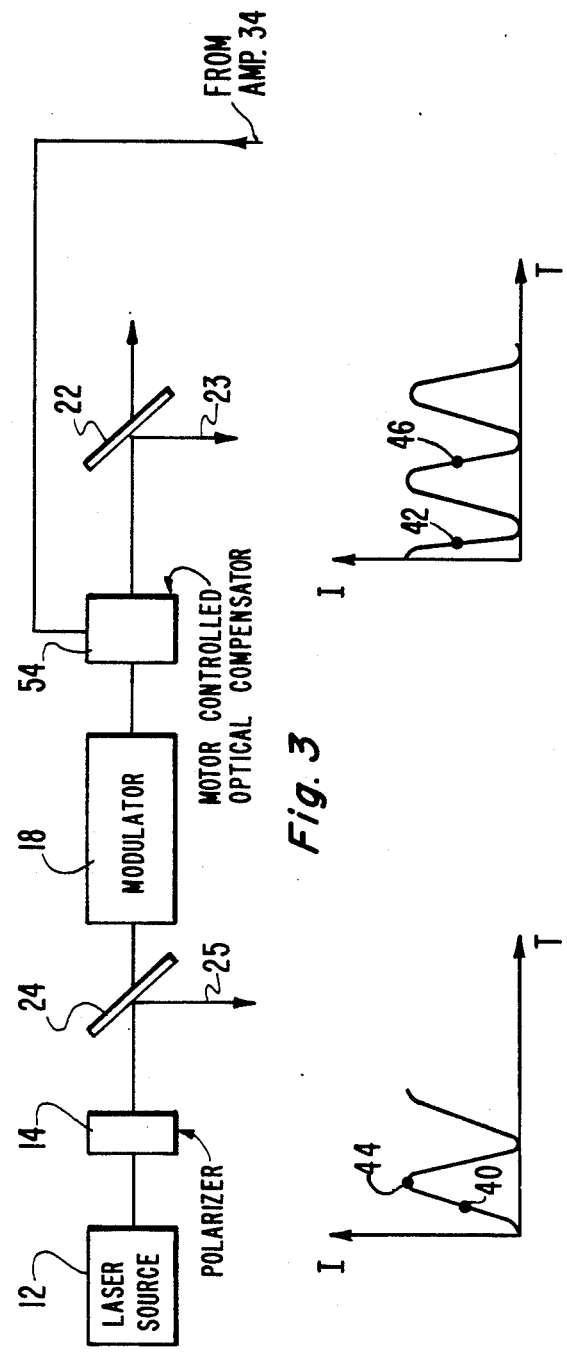

AUTOMATIC OPTICAL BIAS CONTROL FOR LIGHT MODULATORS

BACKGROUND OF THE INVENTION

This invention relates to light modulators and more particularly to electro-optical crystal modulators wherein the output light intensity is maintained constant at a given value about which the modulation takes place. This invention is particularly directed to a new control system for an electro-optic light modulator which is adapted to correct thermal effects causing variations in the output light intensity.

It is conventional to employ electro-optic crystals for modulation of coherent laser radiation in, for example, pulse modulation communications systems. In conventional apparatus, a beam of coherent light from a laser is passed through a polarizer to polarize the light in a first plane. The polarized light is passed through an electro-optic crystal modulator which changes the instantaneous orientation of the plane of polarization of the beam in response to an electric field impressed on the electro-optic crystal. The light transmitted by the electro-optic crystal modulator impinges on an analyzer and is transmitted by the analyzer to an extent which is a function of the angle formed by the polarization direction of the analyzer and the instantaneous polarization direction of the laser beam impinging on the analyzer.

A serious problem occasioned by the use of electro-optic crystals as modulators is the variation in light output intensity caused by the change in birefringence of the crystal as a function of temperature. Heretofore, this problem has lead to various types of oven and control systems to alleviate this problem. One system relies on the sensing of a change of temperature at the crystal mount which is fed back as a correction signal to the heater assembly associated with the crystal mount. However, since these temperature sensing devices cannot sense the crystal temperature, but only some temperature at a point in close proximity, a continual drifting of the birefringence and a resulting variation in the depth of modulation of the transmitted light beam is experienced. Further, even if the crystal temperature were monitored accurately, a problem arises from the fact that it is the temperature in a small center portion of the crystal along the optical path which is important. For example, in lasers of the $CO_2$ type, the heating effect of the laser beam itself can produce large temperature differentials along the cross-section of the electro-optic crystal. Accordingly, sensing the temperature of the outside surface of the crystal is of doubtful value. In addition to the changes of birefringence of the crystal modulator caused by the crystal temperature variations, changes in temperature of any other component which is part of the modulator assembly may also produce changes in the intensity of the output light beam.

Other systems have been proposed to correct for thermal affects in electro-optic modulators by controlling the electric field bias applied to the modulator in response to a feedback signal. These systems utilize a low-frequency probe signal which is superimposed on the modulator bias and is detected by, for example, a photodetector at the output of the laser modulator in order to develop an error signal which is a function of the deviation of the output from a maximum, or other desired optimum output condition. The error signal is used to change the electric field bias applied to the modulator in order to restore the output to the maximum or desired optimum condition. These systems are sometimes adequate for low output level lasers and low modulation frequencies, as the temperature changes encountered in these electro-optic crystal modulator applications are relatively small. However, in the case of a high power laser such as, for example, a $CO_2$ laser, the modulator absorbs a substantial amount of heat from the laser beam itself. Additionally, at high modulation frequencies the modulating RF energy is also absorbed into the crystal material. This results in substantial changes in temperature which vary according to the type of modulation applied to the crystal modulator. Accordingly, the birefringence of the crystals and therefore the optical path length difference may change over many wavelengths. The voltages required to compensate for these changes ordinarily run into several tens of thousands of volts, which may be well above the dielectric strength of the electro-optic crystal material thereby resulting in a breakdown of the crystal material.

The present invention overcomes the disadvantages of the prior art and proposes a system which further simplifies and reduces the cost of that disclosed in U.S. Pat. No. 3,780,296 issued to the present inventor on Dec. 18, 1973, and assigned to RCA Limited. The present system senses the average intensity of both the input and output beams. The ratio of the intensities is compared with an adjustable external component and the result is used to change the temperature of the modulation crystal or of an external birefringent crystal compensator or external phase shifting device.

The present arrangement is particularly suitable when the following conditions are met:

1. A high carrier-to-noise ratio is always available at the receiving end. In this condition, a slight departure from the optimum conditions is rather inconsequential. This applies particularly to very short communication links.

2. Occasional infrequent readjustments of optical bias are acceptable. Such a frequency would be at the rate of not more than once or twice a day.

3. The system is expected to be at an accessible location to allow the adjustments.

4. The ultimate performance in carrier/noise is not required.

5. The cost must be relatively low and in particular lower than the system disclosed in the U.S. Pat. No. 3,780,296.

SUMMARY OF THE INVENTION

The present invention relates to an electro-optic modulator comprising a light source for providing an input beam of coherent polarized light radiation, an electro-optic crystal modulator positioned in the path of the light beam, with an electric field applied to the modulator to modulate the polarization state of the beam, and a modulation splitter positioned in the path of the beam to convert the polarization modulation of the beam into intensity modulation of the output beam emerging from the modulation splitter. First and second light intensity detectors are positioned to detect a portion of the input beam and of the modulated output beam. The ratio between the input and the output beams is obtained by a divisor means and is maintained constant by a comparison means which controls a compensator means, that is, rotates the polarization of the output beam and consequently maintains the intensity of the output beam at a given value relative to the input beam.

BRIEF DESCRIPTION OF THE DRAWING

FIGS. 2 & 3 are two block diagrams of a portion of the modulator shown in FIG. 1 comprising alternative compensator means;

FIGS. 4 & 5 are graphical representations illustrating the relationship between the changes of temperature of the modulator crystal and the variations of the intensity of two output beams.

DETAILED DESCRIPTION

Figure 1:
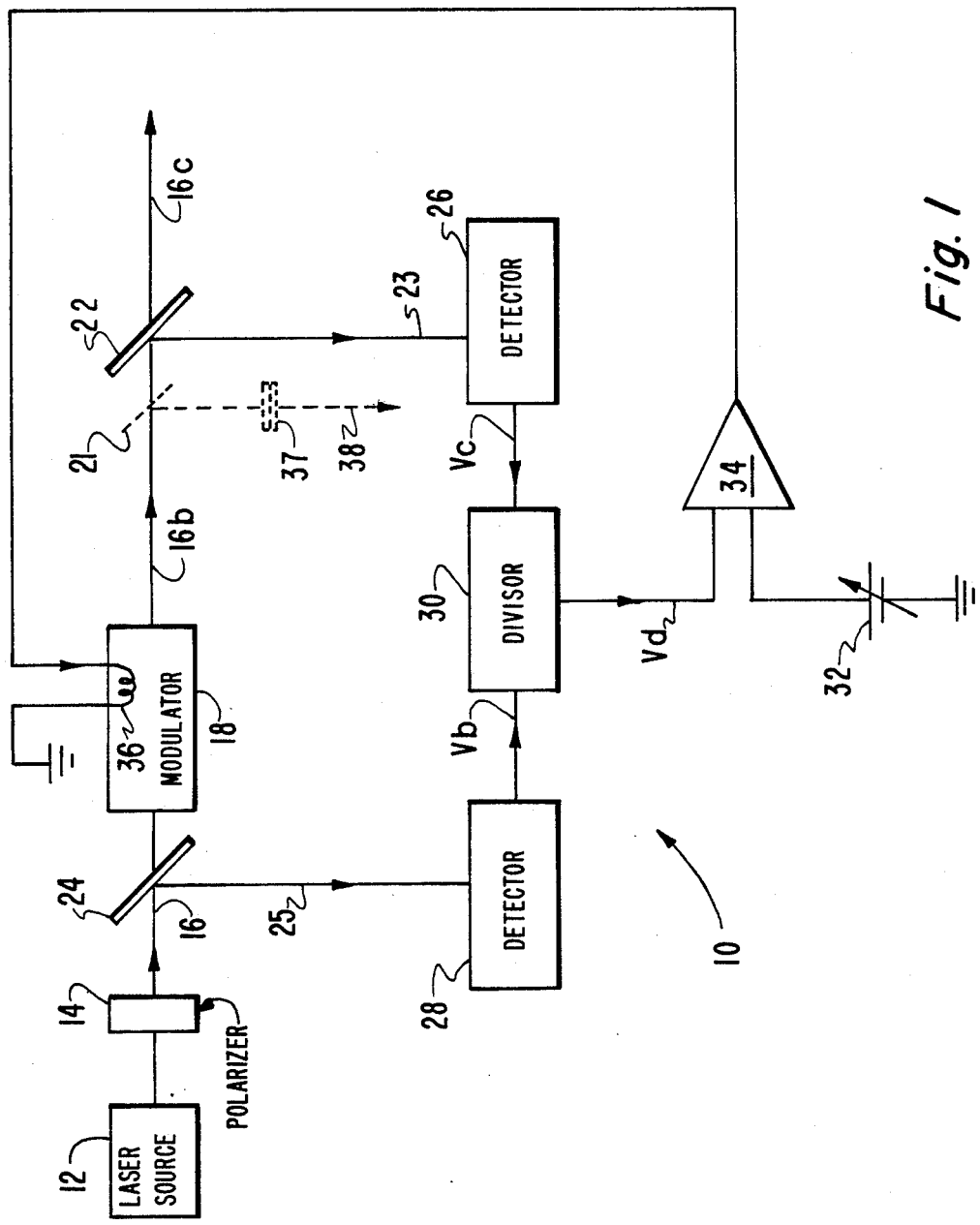
FIG. 1 is a block diagram of a preferred embodiment of a laser beam modulator in accordance with the present invention.

Referring now to FIG. 1, there is shown generally at 10 an electro-optic crystal modulator system in accordance with the present invention. The laser source 12 provides a coherent light radiation which passes through a polarizer 14 to give a linearly polarized input beam 16. The beam 16 passes through an electro-optic crystal modulator 18, such as a Kerr cell, Faraday modulator or a Pockel cell in which the light beam undergoes polarization modulation in response to an electric field being applied to the modulator by an external source, not shown. The output beam at 16b from modulator 18 is then transmitted through a polarization splitter 22, which on the one hand converts the polarization modulation 16b into intensity modulation at 16c, and on the other hand, extracts the polarization component perpendicular to the original polarization after modulation has taken place. This extracted beam is shown as 23. The polarization splitter 22 is a polarization prism such as the known Glan Thompson prism. The polarization splitter 22 performs the double function which is, first to serve as an analyzer to provide beam 16c, and as a reflector to reflect the beam 23 which is complementary to the beam 16c.

As explained above, beam 16c varies in intensity due in particular to variations in temperature in the electro-optic modulator 18. In order to detect and automatically control these variations of intensity, light intensity beam splitter 24 which is a partly reflective mirror, is positioned across the input beam 16 while polarization splitter 22 is positioned across the output beam 16b. Each of these splitters 22 & 24 reflect a portion of the beam through 23 & 25 which are respectfully detected by detectors 26 & 28. Detector 28 senses the input beam 16 while detector 26 senses the output beam 16b. These detectors may be photoelectric detectors, photo-cells, P-I-N detectors or in general any electro-magnetic radiation detectors which converts the intensity of a beam into a voltage indication. A divisor 30 receives the voltage recorded by both detectors 26 and 28 in order to establish a ratio between the electrical signals received. Such a divisor may be a small integrated circuit computer which is intended to perform a division. The voltage $V_d$ which is the resultant voltage of the divisor 30 is compared with an adjustable dc voltage 32 which is located at the input of an operational amplifier 34. The output of the amplifier 34 is connected to an appropriate heater assembly 36 thermally coupled to the modulator 18 so as to vary the thermal conditions of the birefringent crystal contained therein. A heater assembly of few watts is usually sufficient for this purpose.

The theory behind this arrangement can be explained as follows. The intensity modulation I at the output 16c can be shown to be related to the phase shift $\Gamma$ between the two polarization components resolved along the electro-optic axis of the modulator crystal by the expression:

$$I = K_3 I_o \sin^2 \Gamma/2 \quad (1)$$

Where $I_o$ is the intensity of the source, and $K_3$ is the constant.

The phase shift $\Gamma$ is itself produced by and is proportional to a voltage applied to the crystal of the modulator. Although the description of the electro-optic effect refers hereto definiteness to a Pockel-effect type of crystal, similar arguments would also apply to other electro-optic effects such as the Kerr or Faraday modulator. The formula (1) would, of course, be different for these other cases. Out of the polarization splitter 22, the intensity at 23 is given by:

$$I_c = K_2 I_o \cos^2 \Gamma/2 \quad (2)$$

Where $K_2$ is another constant.

Detector 26 converts this intensity into a voltage $V_c$ proportional to this intensity, so that $$V_c = K_4 I_c \quad (3)$$

Detector 28 monitors the yet unmodulated source by detecting the beam 25, namely:

$$I_b = K_1 I_o \quad (4)$$

The output of the detector 28 is then $$V_b = K_5 I_b \quad (5)$$

The output of both detectors 26 & 28 are then applied to an operational or digital divisor 30. The output voltage $V_d$ is then given by the formula $$V_d = (V_c/V_b) = K_6 \cos^2 \Gamma/2 \quad (6)$$

Where $K_6$ is a constant.

From formula (6) it can be realized that $V_d$ is independent of the term representing the intensity of the source, namely $I_o$. Consequently, the fluctuations in the source intensity will not affect the output voltage $V_d$.

The operation of the system will not be explained by referring to the graphical representations shown in FIGS. 4 and 5. These figures represent the variations of intensity (I) relative to the variations of temperature (T). In particular, it is noted that as the temperature of the modulator crystal changes, the intensity of the output beam 16c varies in a sinusoidal type curve as shown in FIG. 4. The corresponding output beam 23 varies as shown in FIG. 5.

Let's suppose that it is decided to stabilize the optical bias at point 40 in the graph of FIG. 4. The portion of the output beam at 23 for that desired condition, is represented at 42 in FIG. 5. This intensity produces a certain value at the output of the detector 26 which is, for instance, $V_{c1}$. The corresponding voltage out of the divisor 30 is determined as $V_{d1}$. If the adjustable dc voltage $E_b$ is set so that it will be equal to $V_{d1}$, the system will stabilize itself at point 40 provided prior care is taken that the feedback at the output of the operational amplifier is of the proper polarity. This system becomes a closed-loop system which will hold the optical bias at the proper operating point without being affected by the fluctuation in the laser output $I_o$.

If another desired operating point is situated at 44 in graph of FIG. 4 so as to produce, in beam 23, an intensity close to a maximum or a minimum, it is desirable to obtain, instead, a signal of 90° out of phase to $I_c$. This can be obtained readily by placing a beam splitter 21 ahead of the polarization separator or splitter 22 and passing the output of the splitter 21 through a quarter wave plate - polarizer combination 37. The beam 38 is now 90° out of phase with the output beam 16c and is shown at position 46 in FIG. 5. When such a correction is required, the output beam 38 instead of 23 is sensed by the detector 26.

The polarization splitter 22 may be replaced, in certain conditions, by an analyzer and a partly reflective mirror. With this arrangement, the analyzer eliminates one polarization component and uses an inclined mirror to reflect a portion of the output beam in the direction of the detector 26.

The present system comprises many advantages. It constitutes a closed-loop type of operation. The information detected is independent of the variation in the intensity of the laser source. The present system does not require a pilot signal as known in the prior art and consequently no potential interference exists with communication signals. Furthermore, it allows the use of external compensation but above all, it is a very simple system which is not expensive. However, the system should not be expected to correct errors caused by transmission variation within the modulator nor correct for detectivity changes in detectors.

From the foregoing, it can be seen that the invention is a system which uses the error signal obtained from the ratio between the source output and the modulator output to correct for polarization rotation changes in the modulator by using temperature feedback of the modulating crystal. It is also possible to use an external compensator such as shown in FIGS. 2 and 3. As seen in FIG. 2, between source 12 and polarization splitter 22, a birefringent material and preferably a birefringent crystal 50 may be introduced in the path of the main beam in order to receive the information provided by the operating amplifier 34. In this arrangement, the electro-optic modulator 18 is not thermally controlled but only the crystal 50 is provided with a heater assembly 52 for adjusting the thermal conditions affecting the light beam between the two splitters 22 and 24.

Another example of an external compensator consists of an optical compensator such as a Babinet-Soleil compensator. The structure and operation of this compensator has been explained in detail in the above-identified U.S. Pat. No. 3,780,296. The desired compensation for the change in birefringence is obtained by applying electrical signals to the input of a stepping motor which controls a knob actuating the wedge members of the compensator 54 shown in FIG. 3.

Compensators of the type disclosed provide the proper optical bias and stabilize it with time, independently of the changes in temperature of the crystal or other birefringent material in the modulator assembly.

The optical modulator is of the type which has a modulation output substantially proportional to the source input level and in which the output varies as a smooth function of the temperature with no discontinuities in the function over the operating region.

What is claimed is:

1. An apparatus for providing modulation of light, of the type which comprises: a light source for providing a beam of coherent light radiation and polarized in a given direction; a polarization splitter positioned in the path of said beam; an electro-optic crystal modulator positioned in the path of said beam between said source and said polarization splitter for modulating the polarization of said beam about said given direction so that the polarization modulation of the beam is converted into an intensity modulated output beam, emerging from said polarization splitter, of a given intensity value about which said intensity modulation takes place; the improvement therein comprising:

a first light beam detector means positioned to detect the intensity of the light beam at the input of said crystal modulator and a second light beam detector means positioned to detect the light intensity of a polarization component of said output beam, said detector means converting said respective input and output beams into electrical signals, a divisor means for establishing the ratio of the electrical signals obtained by said first and second detector means, a variable compensator means for said modulator adapted to produce a rotation of the polarization of the beam at the output of said modulator and consequently vary the intensity of the beam emerging from said splitter, means connected between said divisor means and said compensator means for operating said compensator means to maintain a constant ratio between said electrical signals detected by said detector means and consequently between the intensities of said input and output beams.

2. An apparatus as recited in claim 1, wherein both detector means are photo-electric detectors adapted to convert light intensities into electric voltages.

3. An apparatus as recited in claim 2, wherein said compensator means comprises a heater assembly thermally coupled to said crystal modulator so as to change the thermal conditions of the latter according to the ratio of the light intensities detected by the detector means.

4. An apparatus as recited in claim 2, wherein said compensator means comprises an optical device disposed in the path of the beam at the output of said modulator which is adapted to vary a degree of birefringence of the beam, and control means connected between said optical device and said divisor means for maintaining a desired ratio of the intensities detected by said detector means.

5. An apparatus as recited in claim 4, wherein the optical device comprises a birefringent crystal and a heater assembly thermally coupled to said last-mentioned crystal whereby a change of temperature changes the degree of birefringence of the crystal.

6. An apparatus as recited in claim 4, wherein the said optical device is a Babinet-Soleil compensator having a control knob wherein the position of said knob determines the degree of birefringence of said compensator, said control means comprising a motor mechanically coupled to said control knob to vary the position of said control knob to maintain said desired ratio.

* * * * *

UNITED STATES PATENT OFFICE
CERTIFICATE OF CORRECTION

PATENT NO. : 4,071,751

DATED : January 31, 1978

INVENTOR(S) : Armand Waksberg

It is certified that error appears in the above-identified patent and that said Letters Patent are hereby corrected as shown below:

Column 4, line 11, change "hereto" to --here for--

Column 4, line 44, change "not" to --now--

Column 4, line 61, change "prior" to --proper--

Signed and Sealed this

Eleventh Day of July 1978

[SEAL]

Attest:

RUTH C. MASON
*Attesting Officer*

DONALD W. BANNER
*Commissioner of Patents and Trademarks*